US010508699B2

(12) United States Patent
Rankin et al.

(10) Patent No.: US 10,508,699 B2
(45) Date of Patent: Dec. 17, 2019

(54) FLOATING ROTOR DISC BRAKE WITH MARCEL EXPANDER RING ATTACHMENT

(71) Applicant: PERFORMANCE FRICTION CORPORATION, Clover, SC (US)

(72) Inventors: Paul Rankin, Charlotte, NC (US); Darin Cate, York, SC (US)

(73) Assignees: PERFORMANCE FRICTION CORPORATION, Clover, SC (US); WHITE OAK COMMERCIAL FINANCE, LLC, New Yor, NY (US)

( * ) Notice: Subject to any disclaimer, the term of this patent is extended or adjusted under 35 U.S.C. 154(b) by 0 days.

(21) Appl. No.: 15/857,261

(22) Filed: Dec. 28, 2017

(65) Prior Publication Data

US 2018/0180123 A1 Jun. 28, 2018

Related U.S. Application Data

(60) Provisional application No. 62/439,819, filed on Dec. 28, 2016.

(51) Int. Cl.
*F16D 65/12* (2006.01)
*F16D 65/02* (2006.01)

(52) U.S. Cl.
CPC .... *F16D 65/123* (2013.01); *F16D 2065/1316* (2013.01); *F16D 2065/1368* (2013.01);
(Continued)

(58) Field of Classification Search
CPC ..... F16D 2065/1392; F16D 2065/1316; F16D 2065/1396; F16D 2065/1368;
(Continued)

(56) References Cited

U.S. PATENT DOCUMENTS

| 7,654,365 B2 | 2/2010 | Lamb |
| 8,651,247 B2 | 2/2014 | Burgoon et al. |

(Continued)

FOREIGN PATENT DOCUMENTS

| DE | 3216108 A1 * | 12/1982 | ........... F16D 65/123 |
| DE | 3441304 A1 * | 5/1985 | ........... F16D 65/126 |

(Continued)

OTHER PUBLICATIONS

International Search Report and Written Opinion, issued in PCT/US2017/068769, dated Mar. 26, 2018.

(Continued)

*Primary Examiner* — Bradley T King
*Assistant Examiner* — Mahbubuir Rashid
(74) *Attorney, Agent, or Firm* — Roberts Mlotkowski Safran Cole & Calderon (57) ABSTRACT

A floating disc brake assembly, and method of assembly, comprising a disc brake rotor comprising an outer friction ring, an inner circumferential flange having a plurality of rotor tabs spaced about the flange and a circumferential groove about the inner circumferential flange, a hat comprising a cylindrical axial body, an outer circumference, a rotor mounting flange extending radially about the outer circumference and having a plurality of rotor mounting tabs spaced about the rotor mounting flange and forming slots interspersed therebetween structured and arranged for receiving the rotor tabs, and a circumferential groove about the outer circumference of the axial body, structured and arranged to align with the circumferential groove of the disc brake rotor, and at least one expander ring structured and arranged to fit within the circumferential grooves of both the rotor and the hat.

14 Claims, 8 Drawing Sheets

(52) U.S. Cl.
CPC ............... *F16D 2065/1376* (2013.01); *F16D 2065/1392* (2013.01); *F16D 2065/1396* (2013.01); *F16D 2200/0021* (2013.01); *F16D 2250/0084* (2013.01)

(58) Field of Classification Search
CPC ....... F16D 2065/136; F16D 2065/1376; F16D 2065/1384; F16D 65/123; F16D 2200/0021; F16D 2250/0084
See application file for complete search history.

(56) References Cited

U.S. PATENT DOCUMENTS

| | | | | |
|---|---|---|---|---|
| 8,950,556 B2 * | 2/2015 | Root | ................... | B60B 27/0052 |
| | | | | 188/18 A |
| 2004/0226786 A1 * | 11/2004 | Shannine | ................ | F16D 65/12 |
| | | | | 188/218 XL |
| 2011/0259683 A1 * | 10/2011 | Hester | .................... | B60T 8/329 |
| | | | | 188/218 XL |
| 2015/0292579 A1 * | 10/2015 | Walther | ................ | F16D 65/123 |
| | | | | 188/58 |
| 2016/0258500 A1 | 9/2016 | Sabeti | | |
| 2016/0298706 A1 | 10/2016 | Rau, III | | |

FOREIGN PATENT DOCUMENTS

| | | | | |
|---|---|---|---|---|
| DE | 19751522 C1 | 5/1999 | | |
| DE | 10358088 A1 | 7/2005 | | |
| EP | 2025965 A1 | 2/2009 | | |
| GB | 2150263 A | 6/1985 | | |
| GB | 2451880 A * | 2/2009 | ........... | F16D 65/123 |
| WO | WO-0006922 A1 * | 2/2000 | ........... | F16D 65/123 |
| WO | WO-2004109141 A1 * | 12/2004 | ........... | F16D 65/123 |

OTHER PUBLICATIONS

European Office Action issued in Application No. 17832710.2 dated Aug. 9, 2019, 3 pages.

* cited by examiner

FLOATING ROTOR DISC BRAKE WITH MARCEL EXPANDER RING ATTACHMENT

RELATED APPLICATION

This application claims priority to U.S. Provisional Application No. 62/439,819, filed on Dec. 28, 2016, the contents of which are hereby incorporated in their entirety.

FIELD

This disclosure relates to improvements in vehicular disc brake assemblies.

BACKGROUND

One type of common prior art brake design for vehicles is a two piece rotor and hat in which a rotor that carries the braking surface is detachably connected to a wheel hat. Another common type of brake design is an integrated one-piece rotor and hub assembly.

Integrated one-piece rotor and hat assemblies have the advantage that no fasteners are required between the rotor and the hat. As a result, the integrated assemblies do not face problems associated with fasteners such as wear and fatigue near fastener openings and potential misalignment due to imperfect machining. A significant drawback, however, is that the assembly is constrained at the hat, which causes thermal distortion of the rotor. During braking, the rotor in such an assembly is subjected to high frictional forces that generate heat in the rotor causing thermal expansion/distortion, temperature variation across the face of the rotor, and heat transfer to the adjacent components including the hat and the bearings. Thermal expansion of the rotor is very limited because of the integral connection between the rotor and the hat, which results in thermal coning of the rotor surface and a large thermal gradient, which will induce high thermal stress leading to thermal cracking. The high thermal gradient generated during braking and the effects of the thermal expansion and distortion can cause vibration and thermal judder across the brake surfaces, resulting in rough or irregular braking pulsations, reduce the life and performance of the rotor and increase maintenance costs. Such thermal distortion can damage the rotor and when the rotor is damaged or worn, the entire integrated assembly must be replaced. This is expensive and time consuming.

One way the thermal stresses have been addressed is to provide a "floating" rotor in which the fastener connection between the rotor and the hat is provided with a small clearance or float that allows thermal expansion. Advantageously, in these designs the rotor is mounted directly to the hat such that braking force is applied in-plane to the hat thus minimizing torsion or twist between the rotor and hat attachment, which can result in cracking and breaking of the rotor.

Stresses induced by conventional fastener assemblies in these designs are also a problem, even in floating rotor brakes. In most conventional designs a rotor attachment flange is held against the hat with a series of bolts or studs capped with nuts at a central portion of the rotor. The hat portion is placed on one side of the attachment flange and a fastener connects the hat portion to the side of the attachment flange. During braking, a frictional force is applied to the rotor surface, which creates torque that is transferred to the attachment flange, to the fastener and to the hat. Because the hat portion is attached to one side of the attachment flange, which is in a plane axially displaced from the friction braking surface, a moment arm is created at this connection joint. When the torque is transferred through a moment arm, bending stresses are formed in the connection. This creates twisting in the areas adjacent the fastener, which can create fatigue leading to cracking and breaking. These bolts or studs absorb and transfer a major amount of the braking force to the hat and are thus subject to intense thermal and bending stresses during braking.

Torque transfer also tends to be non-uniform through the perforated flange, especially in a floating design, as the machining tolerance at each flange causes certain connections to receive more torque than other connections. This creates high stresses at individual flanges and can cause the attachment flange to crack or to have portions break off.

The two-piece hat/rotor assemblies discussed above also have drawbacks associated with the hat portion, which typically has slots that match with the perforations in the rotor attachment flange. Some floating type two piece hat/rotor assemblies use a spacer, sometimes called a bobbin, to provide the clearance that accommodates thermal expansion. The bobbin fits in the slots of the hat piece or in slots of the rotor flange, and when torque is applied to the hat through the rotor, the bobbin twists in the slot. This twisting causes the edges of the bobbin, which are typically square to match the slot, to gouge the sides of the slots, thus damaging the slotted piece. This is especially true when the hat piece is manufactured from a material having a lower hardness, such as aluminum, which is popular in high performance and racing applications, or when the rotor is formed of cast iron.

As such, these parts represent another weak link in the system, and can break-off during maintenance procedures. Additionally, holes drilled in the rotors for receiving these connectors can weaken the overall design and likewise crack due to the thermal and torsional forces created during braking.

However, despite recent advances, there remains an unmet need in the art to optimize and simplify attachment of floating disc brake rotors to wheel hats.

There is a need, therefore, to provide a hat and rotor assembly that eliminates bending stresses and promotes uniform torque transfer, so as to minimize bending and fatigue stresses to increase the life and reliability of the brake device.

SUMMARY

Provided is a floating disc brake assembly, comprising a disc brake rotor comprising an outer friction ring, an inner circumferential flange having a plurality of rotor tabs spaced about the flange and a circumferential groove about the inner circumferential flange, a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a circumferential groove about the outer circumference of the axial body, structured and arranged to align with the circumferential groove of the disc brake rotor, and at least one expander ring structured and arranged to fit within the circumferential grooves of both the rotor and the hat.

In one form, the expander ring has a radial wave having peak portions and valley portions formed around the entirety of the ring.

In another form, the peak portions and valley portions of the radial wave are structured and arranged to fit into the circumferential grooves of the disc brake rotor and hat, respectively.

In another form, the circumferential groove of the disc brake rotor and the circumferential groove of the hat are structured and arranged to compress the peak portions and valley portions of the expander ring, applying radial pressure to both the hat and the disc, securing the disc brake rotor to the hat.

Advantageously, both the disc and the hat have tapered bottom walls on the circumference of their respective circumferential grooves.

Conveniently, a portion of the cylindrical axial body of the hat is chamfered to fit into the inner circumferential flange of the disc brake rotor and compress the valley portions of the expander ring upon assembly.

In another form, the expander ring further comprises an axial wave to apply axial pressure to sidewalls of said circumferential grooves when assembled.

In yet another form, the expander ring is made of spring steel, which can be stainless steel, and can have a rectangular cross-section.

Advantageously, neither the rotor tabs nor the rotor mounting tabs have apertures or through holes, and the rotor tabs and the rotor mounting tabs are substantially coplanar when the rotor is mounted on the rotor mounting flange.

Also presented is a method of assembling a floating disc brake, comprising providing a disc brake rotor comprising an outer friction ring, an inner circumferential flange having a plurality of rotor tabs spaced about the flange and a circumferential groove about the inner circumferential flange, providing a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a circumferential groove about the outer circumference of the axial body, structured and arranged to align with the circumferential groove of the disc brake rotor, and providing at least one expander ring within the circumferential groove of the rotor.

In one form, the expander ring has a radial wave having peak portions and valley portions formed around the entirety of the ring, expanding the ring and fitting the peak portions into the circumferential groove of the rotor.

In another form, a portion of the cylindrical axial body of the hat is chamfered to fit into the inner circumferential flange of the disc brake rotor; and the method further comprises aligning the rotor tabs with the slots in the rotor mounting flange, and pushing chamfered portion of the cylindrical axial body into the inner circumferential flange of the disc brake rotor, expanding the expander ring and forcing the valley portions of the radial wave into the circumferential groove of the hat.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

This disclosure is to cover all modifications and equivalents as defined by the appended claims. It should also be understood that the drawings are not necessarily to scale, emphasis instead being placed upon clearly illustrating principles of exemplary forms of the present disclosure. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

The forms disclosed herein are illustrated by way of example, and not by way of limitation, in the figures of the accompanying drawings and in which like reference numerals refer to similar elements and in which.

DETAILED DESCRIPTION

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

In the figures, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

The present document discloses a new retention system for connecting a floating disc brake rotor to a hat, which incorporates an expander ring between the disc and hat. About half of the groove is located in the rotor disc and about half of the groove is located around the circumference of the axial body of the hat. The expander ring fills both halves of the groove. Once installed the ring prevents lateral separation of the disc and hat in the direction of the axis of rotation. The assembled floating disc brake assembly is not intended to be separated.

The ring has a radial wave around its entirety, which acts as a spring when compressed and imposes a radial force of as much as 2000 psig on the rotor disc and hat. Additionally, both the disc and hat have a tapered wall on the circumference of their respective grooves and the radial force imparted by the wave spring acts upon the tapered walls creating a lateral force in opposite directions, thus pushing the disc and hat into each other to prevent rattling between the components.

Figure 1:
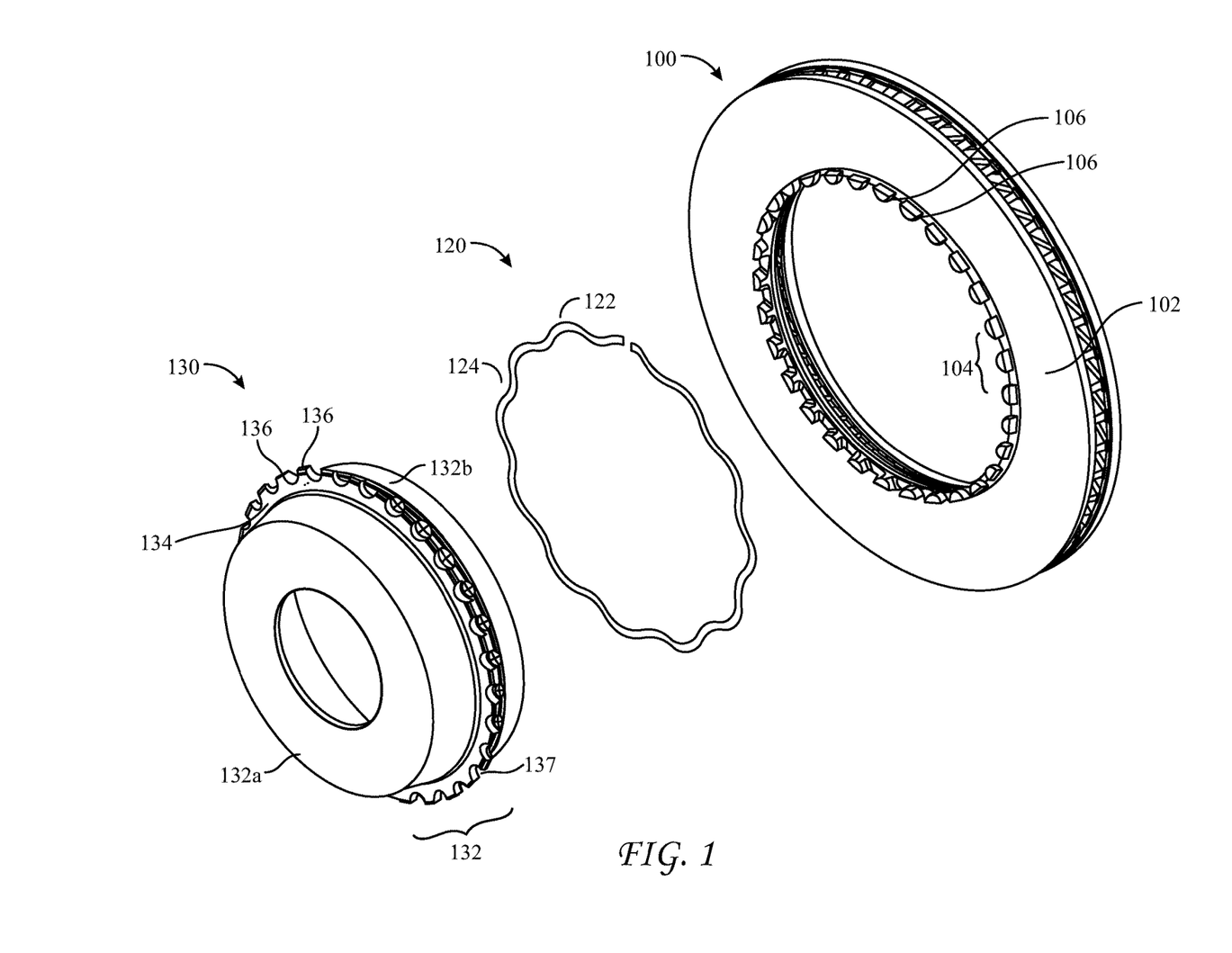
FIG. 1 presents an exploded view of the floating disc brake assembly of the present disclosure.

FIG. 1 shows an exploded view of the floating disc brake assembly, including a disc brake rotor 100 with an outer friction ring 102, an inner circumferential flange 104 which has a plurality of rotor tabs 106 spaced about the flange, and a circumferential groove 108 (FIG. 3) about the inner circumferential flange. The disc brake also includes a hat 130, which is a cylindrical axial body 132 having axially opposed first and second ends 132a, 132b respectively, an outer circumference of the body which has a rotor mounting flange 134 extending radially about it and has a plurality of rotor mounting tabs 136. The plurality of rotor mounting tabs 136 are spaced about the rotor mounting flange 134 and form slots 137 which are interspersed therebetween, the slots 137 being arranged for receiving the rotor tabs 106. Similar to the rotor, the hat also includes a circumferential groove 138 (FIG. 4) about the outer circumference of the axial body 132, which is structured and arranged to align with the circumferential groove 108 of the disc brake rotor, when assembled. The disc brake additionally has at least one expander ring 120 structured and arranged to fit within the circumferential grooves 108, 138 of both the rotor and the hat, to axially secure the rotor 100 to the hat 130.

Figure 2A:
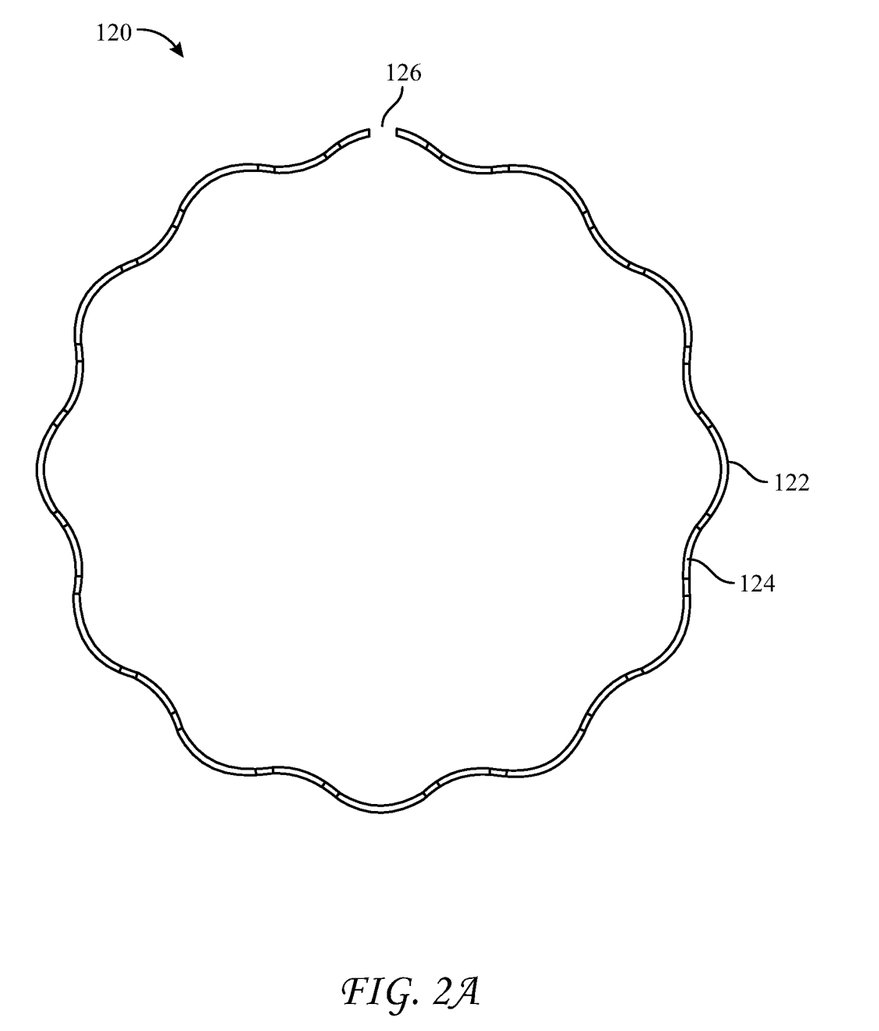
FIGS. 2A and 2B present isolated views of expander rings of the present disclosure.
Figure 2B:
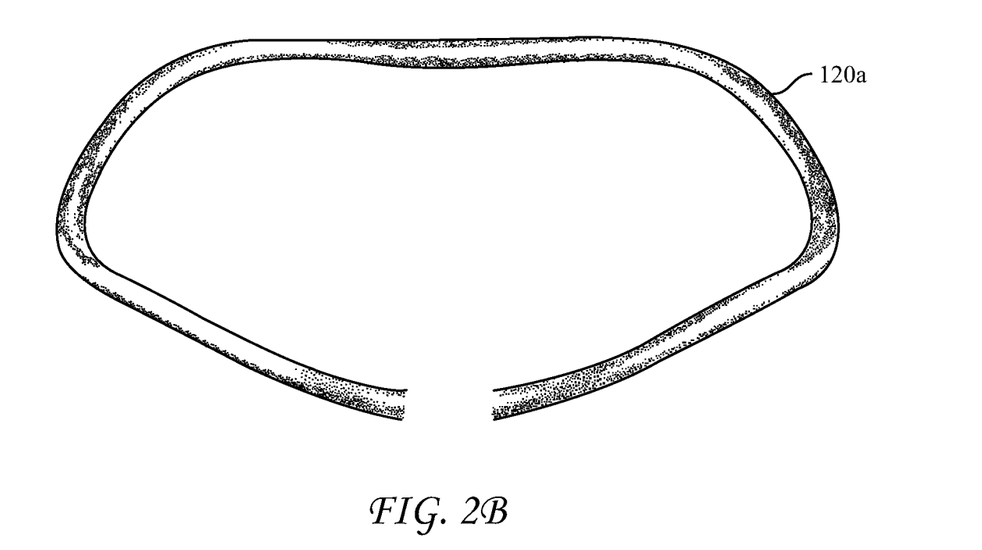

The expander ring 120 can be a Marcel expander ring (Smalley Steel Ring Co., Lake Zurich, Ill.) which has a radial wave having peak portions 122 and valley portions 124 formed around the entirety of the ring, as shown in FIG. 2A. In one form the expander ring 120 has a gap 126 to provide for easier expansion, but could also be configured with overlapping ends, such as in a spiral ring, which would also permit expansion. The peak portions 122 and valley portions 124 of the radial wave are structured and arranged to fit into the circumferential grooves 108, 138 of the disc brake rotor 100 and hat 130, respectively. In another form, the expander ring further comprises an axial wave to apply axial pressure to sidewalls of said circumferential grooves when assembled. FIG. 2B shows an alternative expander ring 120a, which has axial waves. It should be understood that the expander ring 120 can have a combination of both radial waves and axial waves, if desired.

Figure 3:
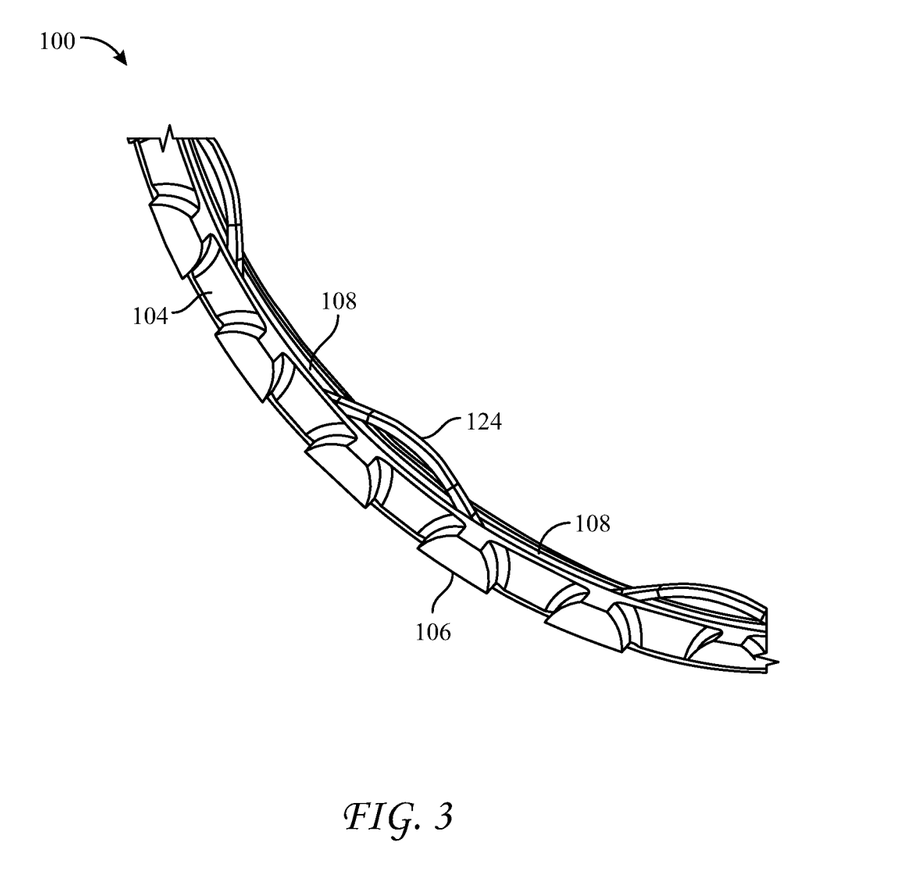
FIG. 3 presents a partial view of the inner circumferential flange of the rotor disc of the present disclosure.

FIG. 3 illustrates a portion of the inner circumferential flange 104 of the disc brake rotor 100, showing the valley portions 124 of the expander ring 120 extending from circumferential rotor groove 108 when installed. It should be understood that peak portions 122, not shown in this view, are fitted into rotor groove 108.

Figure 4:
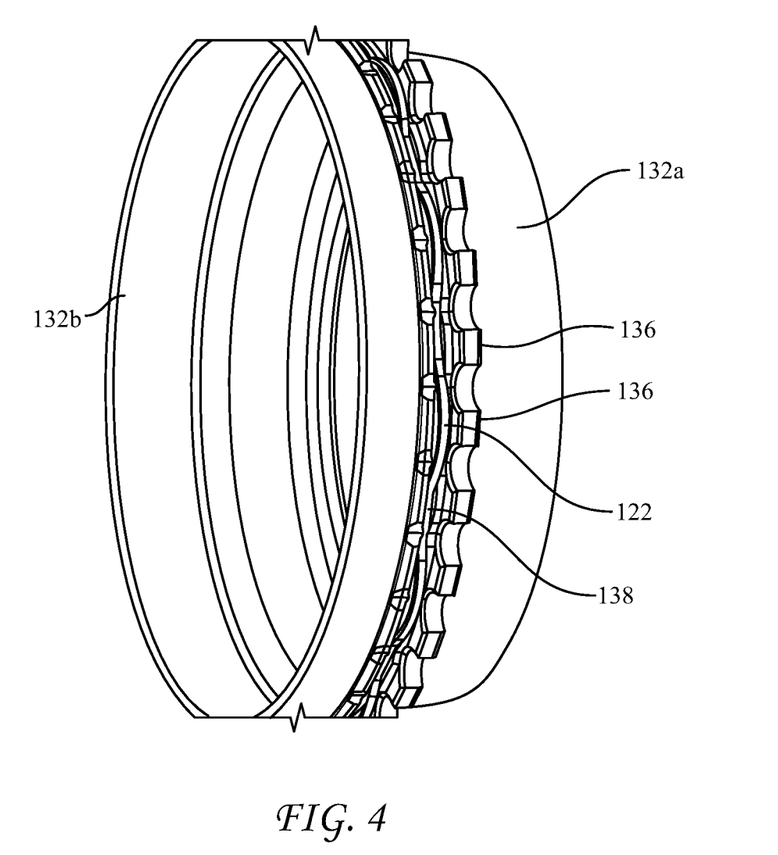
FIG. 4 presents a partial view of the hat of the present disclosure.

FIG. 4 shows the matching portion of the hat 132 and the peak portions 122 of expander ring 120 extending above the circumferential groove 138 in the rotor mounting flange of the hat, with valley portions 124, not shown in this view, fitted into circumferential groove 138.

Figure 5:
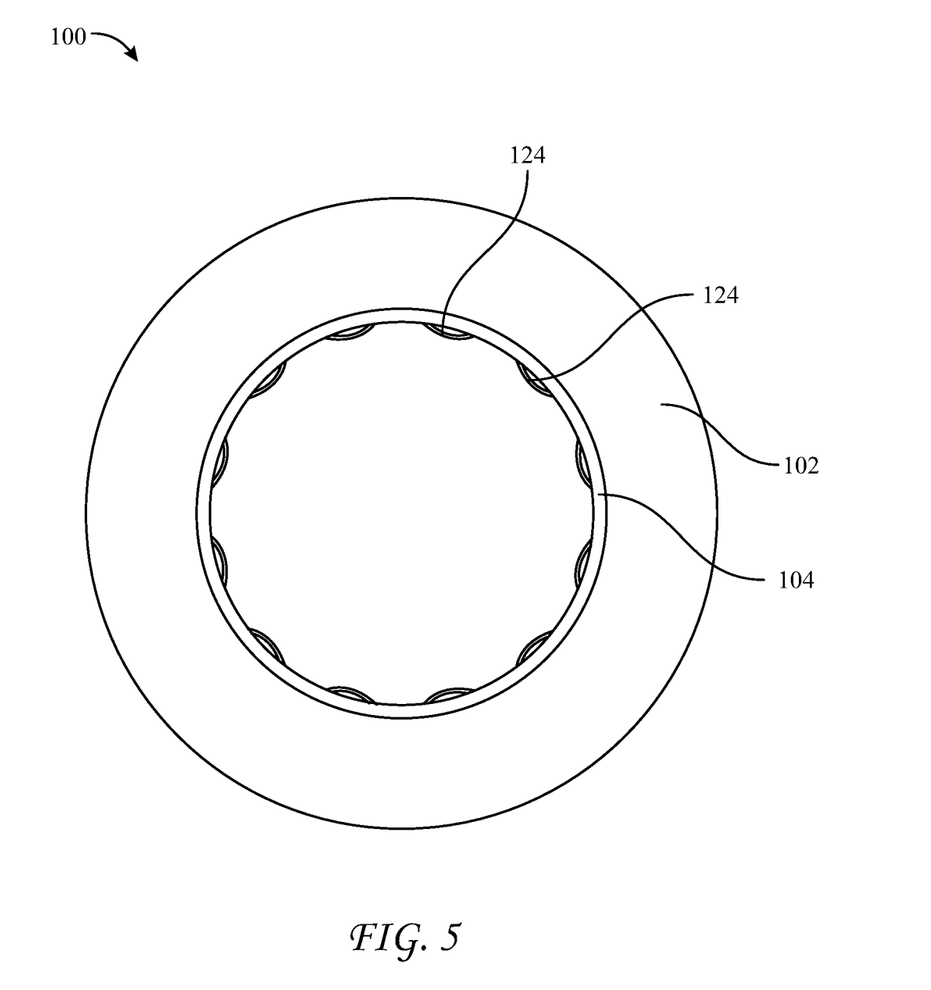
FIG. 5 presents a front view of the rotor disc of the present disclosure with the expander spring installed.

FIG. 5 illustrates a front view of the disc brake rotor 100 with the expander ring 120 installed in rotor groove 108, showing the valley portions 124 of the expander ring 120 extending above the inner circumferential surface of the rotor 100. In this view, the rotor tabs are not shown for clarity.

The circumferential groove 108 of the disc brake rotor and the circumferential groove 138 of the hat are structured and arranged to compress the peak portions 122 and valley portions 124 of the expander ring 120 when assembled, thus applying radial pressure to both the hat 130 and the disc 100 and securing the disc brake rotor 100 to the hat 130. A portion 132c (FIG. 6) of the cylindrical axial body 132 of the hat 130 is chamfered to fit into the inner circumferential flange 104 of the disc brake rotor 100 and expand the expander ring 120 upon assembly, such that the valley portions 124 of the wave are compressed towards the rotor groove 108 sufficiently to permit the axial body 132 of the hat 130 to fit into the inner circumferential flange 104 of the rotor 100 far enough such that hat groove 138 aligns with rotor groove 108, and the valley portions 124 of the expander spring 120 snap into place in hat groove 138.

Figure 6:
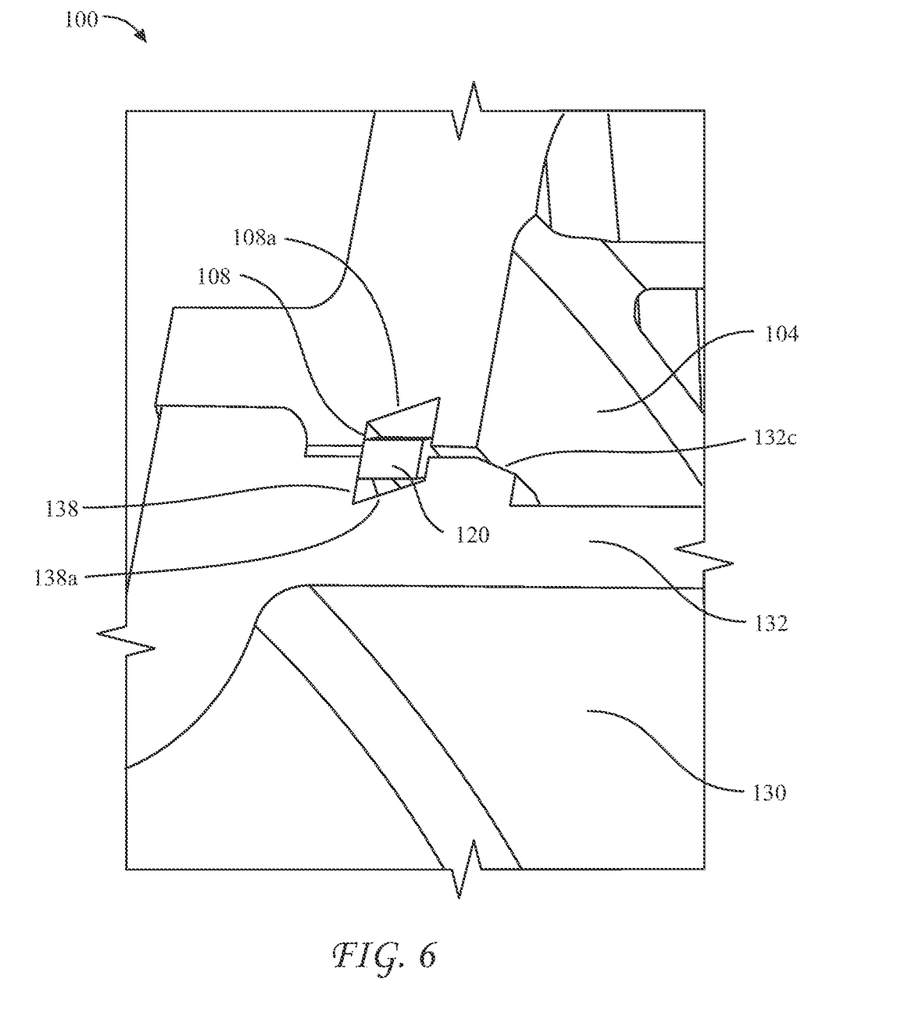
FIG. 6 presents a cutaway view of the assembled rotor disc, the expander ring within the groove, and hat.

FIG. 6 shows a cutaway view of the rotor 100 mounted to the hat 130, wherein both the disc and the hat have tapered bottom walls 108a, 138a on the circumference of their respective circumferential grooves 108, 138. Chamfer 132c is shown on the circumference of the cylindrical axial body 132.

The expander ring 120 can have a round cross-section, an oval cross-section, a square cross-section, a rectangular cross-section, a triangular cross-section or any other desired polygonal cross-section, and is advantageously made of spring steel, which can be stainless steel.

Advantageously, neither the rotor tabs 106 nor the rotor mounting tabs 136 have apertures or through holes, and the rotor tabs 106 and the rotor mounting tabs 136 are substantially coplanar when the rotor 100 is mounted on the rotor mounting flange 134.

Figure 7:
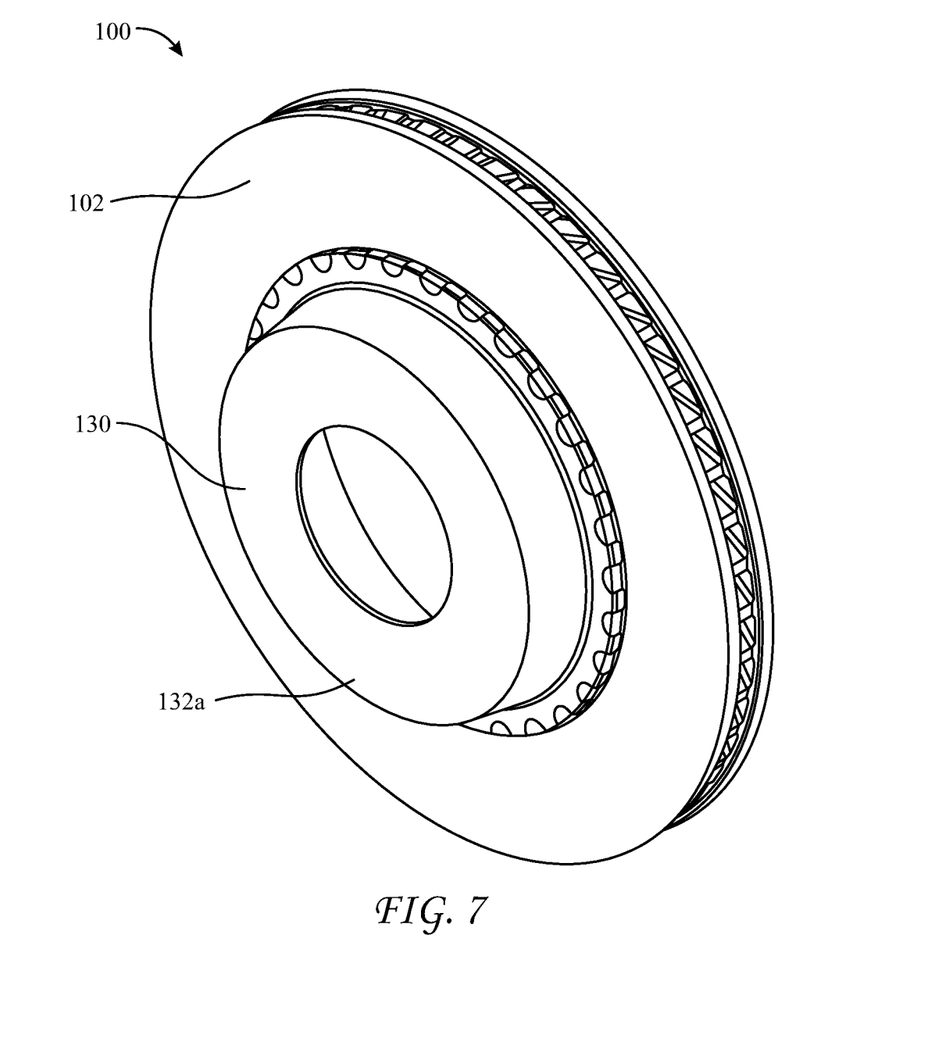
FIG. 7 presents an assembled view of the floating disc brake assembly of the present disclosure.

FIG. 7 illustrates the assembled floating disc brake assembly described herein, with the hat 130 and the first end 132a extending from the plane of rotor 100 and friction ring 102.

Also presented is a method of assembling a floating disc brake, comprising providing a disc brake rotor comprising an outer friction ring, an inner circumferential flange having a plurality of rotor tabs spaced about the flange and a circumferential groove about the inner circumferential flange, providing a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a circumferential groove about the outer circumference of the axial body, structured and arranged to align with the circumferential groove of the disc brake rotor, and providing at least one expander ring within the circumferential groove of the rotor.

In one form, the expander ring has a radial wave having peak portions and valley portions formed around the entirety of the ring, further comprising expanding the ring and fitting the peak portions into the circumferential groove of the rotor.

In another form, a portion of the cylindrical axial body of the hat is chamfered to fit into the inner circumferential flange of the disc brake rotor; and the method further comprises aligning the rotor tabs with the slots in the rotor mounting flange, and pushing the chamfered portion of the cylindrical axial body into the inner circumferential flange of the disc brake rotor, expanding the expander ring and forcing the valley portions of the radial wave into the circumferential groove of the hat.

Accordingly, with the ring installed in the disc the hat can be installed by aligning the hat and disc tabs and slots and pushing the hat into the disc. The lead-in chamfer of the axial body of the hat expands the radial waves outward and gives clearance for the hat to mount into the disc, aligning the grooves. With the grooves aligned the expander ring is allowed to expand radially inward to fill the groove of the hat.

EXAMPLES

Further illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

PCT1. A floating disc brake assembly, comprising a disc brake rotor comprising an outer friction ring, an inner circumferential flange having a plurality of rotor tabs spaced about the flange and a circumferential groove about the inner circumferential flange; a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a circumferential groove about the outer circumference of the axial body, structured and arranged to align with the circumferential groove of the disc brake rotor; and at least one expander ring structured and arranged to fit within the circumferential grooves of both the rotor and the hat.

PCT2. The floating disc brake assembly of paragraph PCT1, wherein the expander ring has a radial wave having peak portions and valley portions formed around the entirety of the ring.

PCT3. The floating disc brake assembly of either paragraph PCT1 or PCT2, wherein peak portions and valley portions of the radial wave are structured and arranged to fit into the circumferential grooves of the disc brake rotor and hat, respectively.

PCT4. The floating disc brake assembly of any of paragraphs PCT1 to PCT3, wherein the circumferential groove of the disc brake rotor and the circumferential groove of the hat are structured and arranged to compress peak portions and valley portions of the expander ring, applying radial pressure to both the hat and the disc, securing the disc brake rotor to the hat.

PCT5. The floating disc brake assembly of any of paragraphs PCT1 to PCT4, wherein both the disc and the hat have tapered bottom walls on the circumference of their respective circumferential grooves.

PCT6. The floating disc brake assembly of any of paragraphs PCT1 to PCT5, wherein a portion of the cylindrical axial body of the hat is chamfered to fit into the inner circumferential flange of the disc brake rotor and compress the valley portions of the expander ring upon assembly.

PCT7. The floating disc brake assembly of any of paragraphs PCT1 to PCT6, wherein the expander ring comprises an axial wave to apply axial pressure to sidewalls of said circumferential grooves when assembled.

PCT8. The floating disc brake assembly of any of paragraphs PCT1 to PCT7, wherein the expander ring is made of spring steel.

PCT9. The floating disc brake assembly of any of paragraphs PCT1 to PCT8, wherein the expander ring has a rectangular cross-section.

PCT10. The floating disc brake assembly of any of paragraphs PCT1 to PCT9, wherein neither the rotor tabs nor the rotor mounting tabs have apertures or through holes and the rotor tabs.

PCT11. The floating disc brake assembly of any of paragraphs PCT1 to PCT10, wherein the rotor tabs and the rotor mounting tabs are substantially coplanar when the rotor is mounted on the rotor mounting flange.

PCT12. A method of assembling a floating disc brake, comprising providing a disc brake rotor comprising an outer friction ring, an inner circumferential flange having a plurality of rotor tabs spaced about the flange and a circumferential groove about the inner circumferential flange; providing a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a circumferential groove about the outer circumference of the axial body, structured and arranged to align with the circumferential groove of the disc brake rotor; and providing at least one expander ring within the circumferential groove of the rotor.

PCT13. The method of paragraph PCT12, wherein the expander ring has a radial wave having peak portions and valley portions formed around the entirety of the ring, expanding the ring and fitting the peak portions into the circumferential groove of the rotor.

PCT14. The method of either paragraph PCT12 or PCT13, wherein a portion of the cylindrical axial body of the hat is chamfered to fit into the inner circumferential flange of the disc brake rotor; aligning the rotor tabs with the slots in the rotor mounting flange; and pushing the chamfered portion of the cylindrical axial body into the inner circumferential flange of the disc brake rotor, expanding the expander ring and forcing the valley portions of the radial wave into the circumferential groove of the hat.

INDUSTRIAL APPLICABILITY

The systems and methods disclosed herein are applicable to the automotive industry.

It is believed that the disclosure set forth above encompasses multiple distinct forms with independent utility. While each of these forms has been disclosed in its preferred form, the specific forms thereof as disclosed and illustrated herein are not to be considered in a limiting sense as numerous variations are possible. The subject matter of the disclosures includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed forms and are novel and non-obvious. Forms embodied in other combinations and subcombinations of features, functions, elements and/or properties may be claimed through amendment of the present claims or presentation of new claims in this or a related application. Such amended or new claims, whether they are directed to a different form or directed to the same form, whether different, broader, narrower, or equal in scope to the original claims, are also regarded as included within the subject matter of the forms of the present disclosure.

What is claimed:

1. A floating disc brake assembly, comprising:
    a disc brake rotor comprising an outer friction ring, an inner circumferential flange having a plurality of rotor tabs spaced about the flange and a continuous circumferential groove about the inner circumferential flange;
    a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a continuous circumferential groove about the outer circumference of the axial body, structured and arranged to align with the circumferential groove of the disc brake rotor; and
    at least one expander ring structured and arranged to fit within the circumferential grooves of both the rotor and the hat.

2. The floating disc brake assembly of claim 1, wherein the expander ring has a radial wave having peak portions and valley portions formed around the entirety of the ring.

3. The floating disc brake assembly of claim 2, wherein the peak portions and valley portions of the radial wave are structured and arranged to fit into the circumferential grooves of the disc brake rotor and hat, respectively.

4. The floating disc brake assembly of claim 2, wherein the circumferential groove of the disc brake rotor and the circumferential groove of the hat are structured and arranged to compress the peak portions and valley portions of the expander ring, applying radial pressure to both the hat and the disc, securing the disc brake rotor to the hat.

5. The floating disc brake assembly of claim 1, wherein both the disc and the hat have tapered bottom walls on the circumference of their respective circumferential grooves.

6. The floating disc brake assembly of claim 1, wherein a portion of the cylindrical axial body of the hat is chamfered to fit into the inner circumferential flange of the disc brake rotor and compress the valley portions of the expander ring upon assembly.

7. The floating disc brake assembly of claim 1, wherein the expander ring comprises an axial wave to apply axial pressure to sidewalls of said circumferential grooves when assembled.

8. The floating disc brake assembly of claim 1, wherein the expander ring is made of spring steel.

9. The floating disc brake assembly of claim 1, wherein the expander ring has a rectangular cross-section.

10. The floating disc brake assembly of claim 1, wherein neither the rotor tabs nor the rotor mounting tabs have apertures or through holes.

11. The floating disc brake assembly of claim 1, wherein the rotor tabs and the rotor mounting tabs are substantially coplanar when the rotor is mounted on the rotor mounting flange.

12. A method of assembling a floating disc brake, comprising:
    providing a disc brake rotor comprising an outer friction ring, an inner circumferential flange having a plurality of rotor tabs spaced about the flange and a continuous circumferential groove about the inner circumferential flange;
    providing a hat comprising a cylindrical axial body having axially opposed first and second ends, an outer circumference, a rotor mounting flange extending radially about the outer circumference and having a plurality of rotor mounting tabs, the plurality of rotor mounting tabs spaced about the rotor mounting flange and forming slots interspersed therebetween, the slots structured and arranged for receiving the rotor tabs, and a continuous circumferential groove about the outer circumference of the axial body, structured and arranged to align with the circumferential groove of the disc brake rotor; and
    providing at least one expander ring within the circumferential groove of the rotor.

13. The method of claim 12, wherein the expander ring has a radial wave having peak portions and valley portions formed around the entirety of the ring, expanding the ring and fitting the peak portions into the circumferential groove of the rotor.

14. The method of claim 13, wherein a portion of the cylindrical axial body of the hat is chamfered to fit into the inner circumferential flange of the disc brake rotor;
    aligning the rotor tabs with the slots in the rotor mounting flange; and
    pushing the chamfered portion of the cylindrical axial body into the inner circumferential flange of the disc brake rotor, expanding the expander ring and forcing the valley portions of the radial wave into the circumferential groove of the hat.

* * * * *